United States Patent [19]

Yasukawa et al.

[11] Patent Number: 4,669,144
[45] Date of Patent: Jun. 2, 1987

[54] WIPER BLADE

[75] Inventors: Takemasa Yasukawa, Inazawa; Hiroshi Sugita, Ichinomiya; Masanori Aritake, Nishikasugai; Keizo Hayashi, Nagoya, all of Japan

[73] Assignee: Toyoda Gosei Co., Ltd., Aichi, Japan

[21] Appl. No.: 790,988

[22] Filed: Oct. 24, 1985

[30] Foreign Application Priority Data

Oct. 26, 1984 [JP] Japan .......................... 59-162771[U]

[51] Int. Cl.⁴ ............................................. B60S 1/38
[52] U.S. Cl. ................................ 15/250.36; 264/340; 428/492
[58] Field of Search ...................... 15/250.36–250.42; 264/340; 428/492

[56] References Cited

U.S. PATENT DOCUMENTS

| 3,882,567 | 5/1975 | Herzog | 15/250.36 |
| 4,103,385 | 8/1978 | Porter | 15/250.36 |
| 4,543,682 | 10/1985 | Kessler et al. | 15/250.36 X |

Primary Examiner—Peter Feldman
Attorney, Agent, or Firm—Cushman, Darby & Cushman

[57] ABSTRACT

A wiper blade comprising a thick base section consisting of a head to be inserted through a slit formed in a backing plate, a body to be extended below the backing plate and a connecting neck interconnecting the head and the body; a turning section having a substantially triangular cross section; a neck section interconnecting the base section and the turning section; and a lip section extended from the ridge of the turning section in the form of a thin strip for wiping the surface of a windshield, wherein at least the surface layer of at least either the connecting neck or the neck section is formed of an ozone-resistant rubber.

5 Claims, 5 Drawing Figures

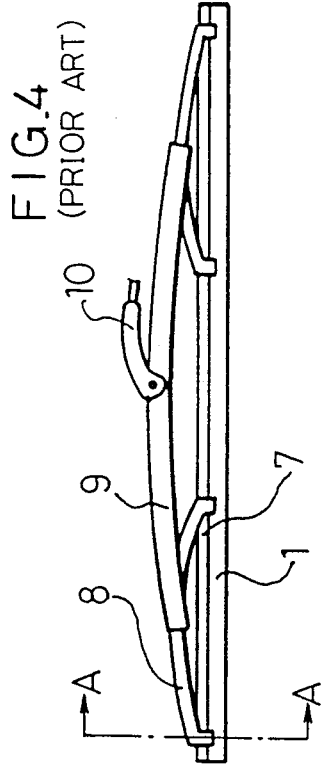
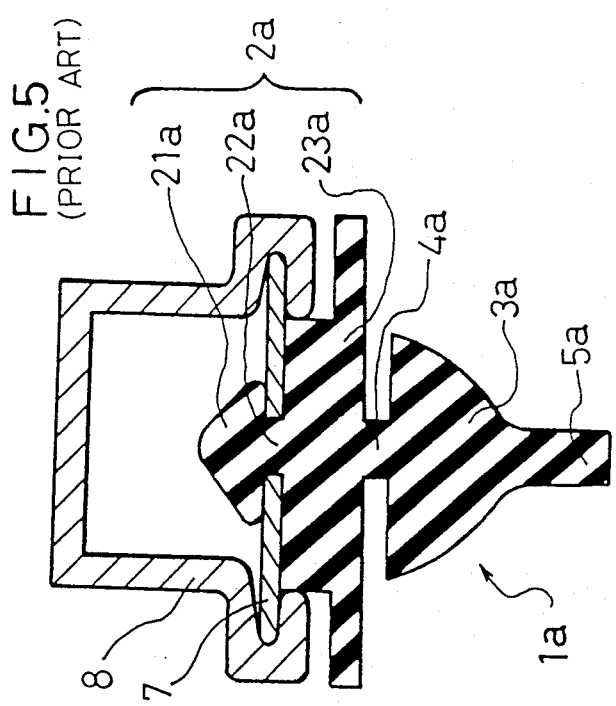
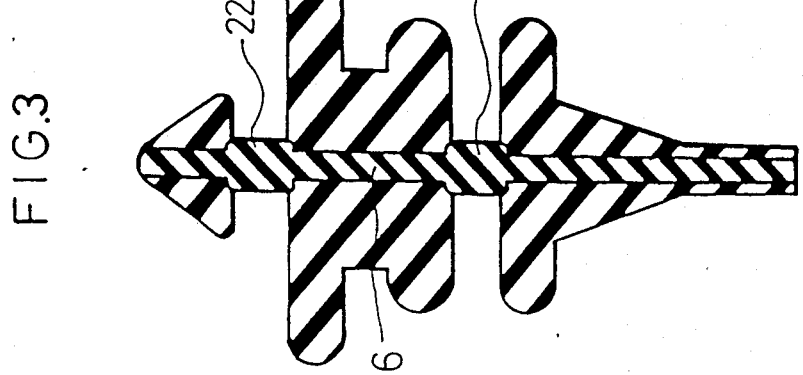

WIPER BLADE

BACKGROUND OF THE INVENTION

1. Field of the Invention

The present invention relates to improvements in a wiper blade and, more particularly, to an ozone-resistant wiper blade.

2. Description of the Prior Art

A windshield wiper, such as shown in FIG. 4, is used for wiping raindrops off the surface of the windshield of an automobile. As illustrated in FIGS. 4 and 5, the windshield wiper comprises a wiper blade 1a formed of a rubber, a backing plate 7 attached to the back of the wiper blade 1a to back up the wiper blade 1a for appropriate flexion, two small holding members 8 holding the backing plate 7 at two separate positions at each of the opposite ends of the backing plate 7, a large holding member 9 pivotally holding each small holding member 8 at the central position of the small holding member 8 and a wiper arm 10 holding the large holding member 9 at the central position of the large holding member 9 and adapted to be driven by an electric motor.

Such a conventional wiper blade 1a as illustrated in FIG. 5 is an elongate rubber strip comprising: a thick base section 2a consisting of a head 21a inserted through a slit formed in the backing plate 7, a body 23a extending below the backing plate 7 and a connecting neck 22a interconnecting the head 21a and the body 23a; a turning section 3a having a substantially triangular cross section; a neck section 4a interconnecting the base section 2a and the turning section 3a; and a lip section 5a extending from the ridge of the turning section in the form of a thin strip.

Since the wiper blade is used outdoors, it is usual that the connecting neck of the base section and the neck section of the conventional wiper blade are deteriorated by ozone and, finally, the connecting neck and the neck section become torn in two to three years. Such a deteriorated wiper blade is incapable of normal function.

SUMMARY OF THE INVENTION

The present invention has been made to overcome the above-mentioned disadvantages of the conventional wiper blade and, therefore, it is an object of the present invention to provide a rubber wiper blade having an ozone-resistant connecting neck and an ozone-resistant neck section, resistant to becoming torn due to ozone-deterioration and capable of maintaining satisfactory wiping performance for an extended period of time.

The present invention provides a wiper blade as shown in FIG. 1, comprising: a thick base section 2 consisting of a head 21 to be inserted through a slit formed in a backing plate, a body 23 to be extended below the backing plate and a connecting neck 22 interconnecting the head 21 and the body 23; a turning section 3 having a substantially triangular cross section; a neck section 4 interconnecting the base section 2 and the turning section 3; and a lip section 5 extended from the ridge of the turning section 3 in the form of a thin strip, wherein at least the surface layer 6 of at least either the connecting neck 22 or the neck section 4 is formed of a rubber having an excellent ozone-resistance.

The term "connecting neck" refers to, as mentioned above, a portion interconnecting the head and the body of the base section and engaging the backing plate. The term "neck section" is a portion interconnecting the base section and the turning section and extending, in cross section, from the center of the base of the substantially triangular turning section. The neck section flexes in opposite directions to allow the turning section to turn in opposite directions.

At least the surface layer of at least either the connecting neck or the neck section is formed of a rubber having an excellent ozone-resistance.

The rubber having an excellent ozone-resistance is superior in ozone resistance, to a diene rubber which generally contains not less than 50 mol % of diene monomer, such as natural rubber and SBR (styrene-butadiene rubber) and the like which are used conventionally for forming the base section and the turning section. Exemplary ozone-resistant rubbers are ethylene-propylene rubbers. Ethylene-propylene rubbers include EPM (a copolymer of ethylene and propylene) and EPDM (Ethylene-propylene-diene terpolymer) which generally contains several mol % of diene monomer.

According to the present invention, at least the surface layer of at least either the connecting neck or the neck section of the wiper blade is formed of such an ozone-resistant rubber. Accordingly, the surface layer of either the connecting neck or the neck section, or the surface layers of both the connecting neck and the neck section may be formed by such an ozone-resistant rubber.

For example, as illustrated in FIG. 1, only the surface layers 6 of the connecting neck 22 and the neck portion 4 may be formed by an ozone-resistant rubber. Such a construction requires a reduced amount of an ozone-resistant rubber, and hence such a construction is economical because an ozone-resistant rubber, such as EPDM, is expensive. Ordinarily, the thickness of the surface layer is about 0.2 mm, which is greater than the thickness of a film formed by chlorinating a diene rubber.

The base section and the turning section are mainly formed of a flexible rubber containing natural rubber as the principal component. Natural rubber, a mixture of natural rubber and chloroprene rubber and a mixture of natural rubber and SBR or the like are optimal flexible rubbers for forming the base section and the turning section. Desirable hardness of the rubber is in the range of 50 to 70 degrees specified in JIS K 6301. The flexible rubber may contain, in addition to rubber components, carbon black, a vulcanizing agent, a filler and the like.

The wiper blade of the present invention can be manufactured through the extrusion molding process. This manufacturing process is the multicolor (two-color) extrusion molding process in which an unvulcanized flexible rubber and an unvulcanized ozone-resistant rubber are extruded simultaneously so that the flexible rubber and the ozone resistant rubber are distributed in a predetermined configuration in an elongate strip. The molding is an elongate strip having a cross section corresponding to that of two wiper blades joined symmetrically together along the edges of the lip sections thereof. The molding is vulcanized at a predetermined temperature, and then the vulcanized molding is cut along the center of the central portion forming the lip sections to divide the molding into two wiper blades. A conventional multicolor extrusion molding machine is applicable to forming the wiper blade of the present invention.

The above and other objects, features and advantages of the present invention will become more apparent from the following description of the preferred embodiment thereof taken in conjunction with the accompanying drawings.

BRIEF DESCRIPTION OF THE DRAWINGS

FIG. 3 is a sectional view of a wiper blade, in a third embodiment, according to the present invention;

FIG. 4 is a front elevation of a typical conventional wiper; and

FIG. 5 is an enlarged sectional view taken along line A—A of FIG. 4.

DESCRIPTION OF THE PREFERRED EMBODIMENTS

Figure 1:
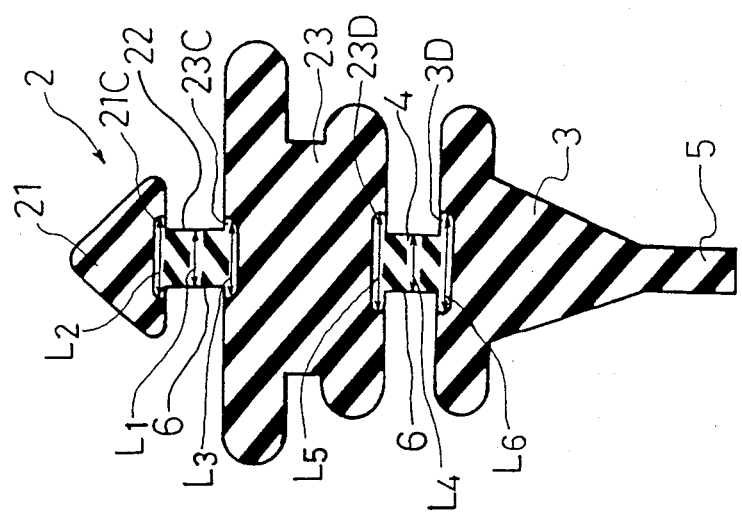
FIG. 1 is a sectional view of a wiper blade, in a first embodiment, according to the present invention.

Referring to FIG. 1 showing a first embodiment of the present invention, a wiper blade 1 comprises a thick base section 2 consisting of a head 21 to be inserted through a slit formed in a backing plate, a body 23 to be extended below the backing plate and a connecting neck 22 interconnecting the head 21 and the body 23; a turning section 3 having a substantially triangular cross section; a neck section 4 interconnecting the base section 2 and the turning section 3; and a lip section 5 having the form of a thin strip. The surface layers 22A of the connecting neck 22 and the surface layers 21A and 23A connecting with both ends of said connecting neck 22, and the surface layer 4B of the neck section 4 and the surface layers 23B and 3B connecting with both ends of said neck section 4 are formed of EPDM, and other portions are formed of a diene rubber. The thickness of the surface layers is 0.2 mm. The base section 2, the neck section 4, the turning section 3 and the lip section 5 are formed of a flexible rubber of 60 degrees in hardness in specified in JIS K 6301. The height and the width of the wiper blade are approximately 11.5 mm and 7 mm, respectively. The thickness and the height of the lip section 5 are 0.75 mm and 1.9 mm, respectively.

This wiper blade was fabricated through the following processes.

An unvulcanized rubber mixture containing 100 parts by weight (referred to simply as "parts" hereinafter) of natural rubber, 30 parts of FEF (Fast Extrusion Furnace) carbon, 3.5 parts of sulfur powder, 2 parts of a processing aid, 5 parts of zinc white, 3.2 parts of an antioxidant and 0.7 parts of a vulcanization accelerator was prepared by a Banbury mixer. This mixture was used as a flexible rubber material. A mixture of 100 parts of JSR EP35EPDM (Nippon Gosei Gomu K.K.), 50 parts of HAF (High Abrasion Furnace) carbon, 5 parts of zinc oxide, 1 part of calcium stearate, 5 parts of CML #31 (calcium oxide; Omi Kagaku K.K.) and 10 parts of a mixture of dicumyl peroxide and silicon oxide ($SiO_2$) at 40:60 was kneaded well by a Banbury mixer to prepare EPDM for forming the surface layers of the connecting neck and the neck section. A molding having a cross section as illustrated in FIG. 1 was obtained through two-color extrusion of the thus prepared rubber materials by using an extruder (screw diameter: 20 mm) for molding the lip section and an extruder (screw diameter: 35 mm) for molding the other portions. The head temperature was 70° C. The extruding condition was controlled so that a predetermined configuration of the sections and a predetermined distribution of the two kinds of rubber materials are obtained. The configuration of the molding corresponds to a symmetrical combination of two wiper blades. The molding was vulcanized at 180° C. for five minutes in a molten salt vulcanizing tank, and then the vulcanized molding was cut along the center thereof with a sharp cutter to obtain wiper blades shown in FIG. 1.

In this wiper blade of the first embodiment, only the surface layers of the connecting neck and the neck section are formed of EPDM. Accordingly, the connecting neck and the neck section of the wiper blade has an excellent ozone-resistance, and hence they are not deteriorated by the action of ozone and will not become torn. The low temperature characteristics of EPDM and the like are somewhat inferior to those of diene rubbers. However, according to the present invention, EPDM is used only to form surface layers and the most part of the wiper blade is formed of a diene rubber. Therefore, the low temperature performance of the wiper blade of the present invention is equivalent to that of the conventional wiper blade. Such a construction requires a reduced amount of EPDM, and hence such a construction is economical because EPDM is expensive.

Figure 2:
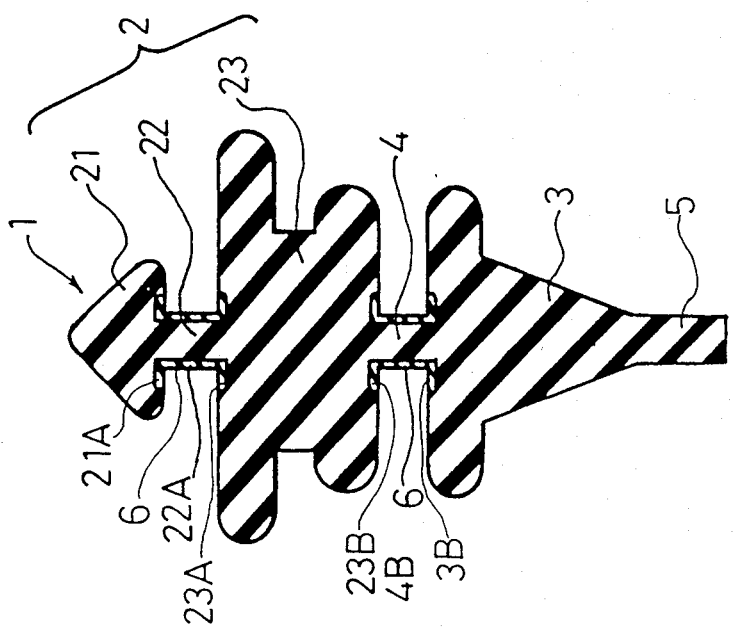
FIG. 2 is a sectional view of a wiper blade, in a second embodiment, according to the present invention.

FIG. 2 shows a second embodiment of the present invention. In this embodiment, the connecting neck 22 and end portions 21C and 23C thereof which connect with both ends of said connecting neck 22 and have widths $L_2$ and $L_3$ larger than the width $L_1$ of said connecting neck 22, and the neck section 4 and end portions 23D and 3D thereof which have the widths $L_5$ and $L_6$ larger than the width $L_4$ of said neck section 4 are strips of a solid ozone-resistant rubber, respectively, and other portions are made of a diene rubber. Hence the connecting neck and the neck section are extremely excellent in ozone-resistance.

FIG. 3 shows a third embodiment of the present invention. In this embodiment, the central portion of the wiper blade from the upper end of the base section 2 to the lower end of the lip section 5 including the connecting neck 22 and the neck section 4 is formed of an ozone-resistant rubber. This wiper blade is extremely excellent in ozone-resistance.

As apparent from the foregoing description of the preferred embodiment of the present invention, a wiper blade according to the present invention comprises a thick base section consisting of a head to be inserted through a slit formed in a backing plate, a body to be extended below the backing plate and a connecting neck 22 interconnecting the head and the body; a turning section having a substantially triangular cross section; a neck section interconnecting the base section and the turning section; and a lip section extended from the ridge of the turning section, in which at least the surface layer of at least either the connecting neck or the neck section is formed of a rubber having an excellent ozone-resistance. Accordingly, both the connecting neck and the neck section or either the connecting neck or the neck section is not subject to ozone deterioration, and hence the unsatisfactory wiping performance of the wiper blade attributable to the damages in the connecting neck and/or the neck section is prevented.

Although the invention has been described in its preferred form with a certain degree of particularity, it is to be understood that various changes and modifications may be made in the invention without departing from the spirit and scope thereof.

What is claimed is:

1. A wiper blade, comprising:

a base serially including, from a free end, a laterally relatively thick head, a laterally relatively thin connecting neck, and a laterally relatively thick body, said connecting neck being at least approximately medially located, so that said head and said body both extend laterally to the left and laterally to the right beyond said connecting neck, said connecting neck being thereby connected at one end to said head and at another end to said body;

a turning section which is at least approximately triangular in transverse cross-sectional shape so as to have, at opposite ends thereof, a turning section base and an apex extending in axially opposite directions, said base of said turning section being thereby laterally thicker than said apex, said apex providing a relatively thin lip; and an at least approximately medially located neck section having axially opposite ends thereof connecting said body, at an opposite end of said base from said head, with said turning section base, said neck section being relatively thin compared with said body at said opposite end of said base and said turning section base;

a first portion comprising said connecting neck section throughout the lateral thickness thereof and axially from end to end thereof, as well as an axially adjoining portion of said head which is laterally thicker than said connecting neck section and is contiguous with said connecting neck section at said one end thereof, and an axially adjoining portion of said body which is laterally thicker than said connecting neck section and is contiguous with said connecting neck section at said other end thereof being formed of solid rubber having an excellent ozone-resistance;

a second portion comprising said neck section throughout the lateral thickness thereof and axially from end to end thereof, as well as an axially adjoining portion of said body which is laterally thicker than said neck section and is contiguous with said neck section at one end thereof, and an axially adjoining portion of said turning section base which is laterally thicker than said neck section and is contiguous with said neck section at an opposite end thereof being formed of solid rubber having an excellent ozone-resistance; and a remaining portion of said wiper blade, exclusive of said first portion and said second portion, being made of diene rubber.

2. The wiper blade of claim 1, wherein:
said first and second portions are made of an ethylene-propylene rubber.

3. A wiper blade, comprising:

a base serially including, from a free end, a laterally relatively thick head, a laterally relatively thin connecting neck, and a laterally relatively thick body, said connecting neck being at least approximately medially located, so that said head and said body both extend laterally to the left and laterally to the right beyond said connecting neck, said connecting neck being thereby connected at one end to said head and at another end to said body;

a turning section which is at least approximately triangular in transverse cross-sectional shape so as to have, at opposite ends thereof, a turning section base and an apex extending in axially opposite directions, said base of said turning section being thereby laterally thicker than said apex, said apex providing a relatively thin lip; and an at least approximately medially located neck section having axially opposite ends thereof connecting said body, at an opposite end of said base from said head, with said turning section base, said neck section being relatively thin compared with said body at said opposite end of said base and said turning section base;

a first, medial portion of said wiper blade, extending axially from said head of said base to said lip and extending laterally substantially throughout the lateral thicknesses of both said connecting neck and said neck, and laterally at least part-way throughout the lateral thickness of said lip, but not throughout laterally-remote regions of said head, said body and said turning section being formed of rubber having an excellent ozone-resistance, which are made of diene rubber.

4. The wiper blade of claim 3, wherein:
laterally remote regions of said lip are made of said diene rubber.

5. The wiper blade of claim 3, wherein:
said first, medial portion is made of an ethylene-propylene rubber.

* * * * *